(12) United States Patent
Ringgenberg (10) Patent No.: US 9,304,054 B2
(45) Date of Patent: Apr. 5, 2016

(54) NON-ELECTRONIC AIR CHAMBER PRESSURE SENSOR

(71) Applicant: Halliburton Energy Services, Inc., Houston, TX (US)

(72) Inventor: Paul David Ringgenberg, Frisco, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/349,635

(22) PCT Filed: Mar. 15, 2013

(86) PCT No.: PCT/US2013/032278
§ 371 (c)(1),
(2) Date: Apr. 3, 2014

(87) PCT Pub. No.: WO2014/143003
PCT Pub. Date: Sep. 18, 2014

(65) Prior Publication Data
US 2016/0003701 A1    Jan. 7, 2016

(51) Int. Cl.
*G01M 3/02* (2006.01)
*E21B 47/06* (2012.01)
*E21B 34/06* (2006.01)
*E21B 34/08* (2006.01)
*E21B 34/14* (2006.01)
*G01L 9/00* (2006.01)
*G01B 7/14* (2006.01)
*E21B 34/00* (2006.01)

(52) U.S. Cl.
CPC .............. *G01M 3/02* (2013.01); *E21B 34/063* (2013.01); *E21B 34/08* (2013.01); *E21B 34/14* (2013.01); *E21B 47/06* (2013.01); *G01B 7/14* (2013.01); *G01L 9/0033* (2013.01); *E21B 2034/002* (2013.01); *E21B 2034/007* (2013.01)

(58) Field of Classification Search
CPC ................ E21B 34/103; E21B 34/063; E21B 2034/002; E21B 2034/007; E21B 47/06; E21B 47/1025; G01L 9/14; G01L 9/16; G01L 9/0082; G01L 9/026; G01L 2009/0067; F16K 37/0033
USPC .............................. 73/728; 137/312, 551, 557
See application file for complete search history.

(56) References Cited

U.S. PATENT DOCUMENTS

| | | | | |
|---|---|---|---|---|
| 2,332,567 A | * | 10/1943 | Gardner | E21B 47/1025 73/152.21 |
| 3,212,471 A | * | 10/1965 | Willis | B01D 35/143 116/267 |
| 3,364,897 A | * | 1/1968 | Mouwen | B01D 35/143 165/80.3 |

(Continued)

FOREIGN PATENT DOCUMENTS

WO    WO-2012045995 A2    4/2012

*Primary Examiner* — Jennifer H Gay (57) ABSTRACT

An apparatus for use in a wellbore having a housing having at least one chamber capable of receiving a fluid, a sealed annular volume, and a non-electronic pressure sensor disposed in the sealed annular volume. The non-electronic sensor includes a sealed, compressible container. Positioned within the sealed, compressible container are first and second magnets that are separated by a first distance when a fluid within the sealed annular volume is at a first pressure. When the fluid in the sealed annular volume is at a second pressure, the first and second magnets are separated by a second distance.

25 Claims, 6 Drawing Sheets

(56) References Cited

U.S. PATENT DOCUMENTS

| | | | | |
|---|---|---|---|---|
| 3,412,706 A | * | 11/1968 | Topol | G01L 9/007 116/267 |
| 3,646,906 A | * | 3/1972 | Hammer | G01L 19/12 116/267 |
| 5,237,957 A | * | 8/1993 | Liucci | G01L 19/12 116/267 |
| 5,341,883 A | | 8/1994 | Ringgenberg | |
| 6,161,835 A | | 12/2000 | Arbuckle | |
| 6,854,335 B1 | * | 2/2005 | Burns | B60C 23/0425 73/728 |
| 7,076,999 B1 | * | 7/2006 | Knox | B60C 23/0425 73/146.3 |
| 7,379,800 B2 | * | 5/2008 | Breed | B60C 23/0425 324/200 |
| 2004/0227302 A1 | | 11/2004 | Burdick et al. | |
| 2006/0212193 A1 | * | 9/2006 | Breed | B60C 23/0425 701/33.7 |
| 2011/0174543 A1 | | 7/2011 | Walkingshaw et al. | |

* cited by examiner

NON-ELECTRONIC AIR CHAMBER PRESSURE SENSOR

CROSS REFERENCE TO RELATED APPLICATIONS

This application claims priority to PCT Patent Application Number PCT/US13/32278 filed on Mar. 15, 2013 entitled NON-ELECTRIC AIR CHAMBER PRESSURE SENSOR the entire teachings of which are incorporated herein.

BACKGROUND

1. Field of the Invention

The present disclosure relates generally to the valves used in wellbores and more specifically to methods and apparatuses for determining seal integrity within the valves.

2. Description of Related Art

Wells are drilled at various depths to access and produce oil, gas, minerals, and other naturally-occurring deposits from subterranean geological formations. The drilling of a well is typically accomplished with a drill bit that is rotated within the well to advance the well by removing topsoil, sand, clay, limestone, calcites, dolomites, or other materials. The drill bit is attached to a drill string that may be rotated to drive the drill bit and within which drilling fluid, referred to as "drilling mud" or "mud", may be delivered downhole. The drilling mud is used to cool and lubricate the drill bit and downhole equipment and is also used to transport any rock fragments or other cuttings to the surface of the well.

As wells are established it is often useful to obtain information about the well and the geological formations through which the well passes. Information gathering may be performed using tools that are delivered downhole by wireline, tools coupled to or integrated into the drill string, or tools delivered on other types of testing strings. Due to the variation in pressures and temperatures associated with downhole fluids, hydraulic and pneumatic mechanisms incorporated into these tester valves may become less reliable and functional when subjected to these downhole conditions. After each use of the tester valves, the tester valve may be completely disassembled and rebuilt. The tester valve may then be pressure tested. The tester valve may have one or more sealed air chambers. However, there is no easy way to determine whether the sealed air chambers have leaks after the tester valve has been subject to the pressure test. Systems, apparatuses, and methods for determining seal integrity after initial assembly or after rebuilding the tester valve are desirable.

SUMMARY

The problems presented by existing systems and methods for determining seal integrity in downhole tools are solved by the systems and methods of the illustrative embodiments described herein. In one embodiment, a valve for use in a wellbore includes a housing configured to form a central passage, a first valve member positionable in an open or closed position to allow or prevent flow through the central passage, and a second valve member positionable in an open or closed position to allow or prevent fluid communication between the central passage and an annulus positioned between the valve and the wellbore. The valve further includes an actuation assembly connected to the first valve member and the second valve member that is movable between a first position and a second position to selectively position each of the first valve member and the second valve member. A sealed annular volume formed between the second valve member and the housing, and a non-electronic pressure sensor is disposed in the sealed annular volume. The non-electronic pressure sensor includes a sealed, compressible container, a first magnet, and a second magnet. The first and second magnets are positioned within the sealed, compressible container such that the first and second magnets are separated by a first distance when a fluid within the sealed annular volume is at a first pressure. Conversely, the first and second magnets are separated by a second distance when the fluid in the sealed annular volume is at a second pressure.

In another illustrative embodiment, an apparatus for use in a wellbore includes a housing having at least one chamber capable of receiving a fluid, a sealed annular volume, and a non-electronic pressure sensor disposed in the sealed annular volume. The non-electronic pressure sensor includes a sealed, compressible container, a first magnet, and a second magnet. The first and second magnets are positioned within the sealed, compressible container such that the first and second magnets are separated by a first distance when a fluid within the sealed annular volume is at a first pressure. Conversely, the first and second magnets are separated by a second distance when the fluid in the sealed annular volume is at a second pressure.

In another illustrative embodiment, a method of determining whether a seal has failed in a downhole apparatus will be described. The downhole apparatus includes a first chamber and a second chamber with a sealed, compressible container disposed in the first chamber. The sealed, compressible container includes first and second magnets disposed therein that are separated by a first distance when a fluid within the sealed, compressible container is at a first pressure. The method for determining whether the seal has failed includes the steps of changing a pressure of fluid within the second chamber, determining a measured distance between the magnets, and comparing the measured distance to the first distance.

In yet another illustrative embodiment, a method for determining whether a chamber in a downhole apparatus is sealed will be described. The downhole apparatus includes the chamber with a sealed, compressible container disposed therein. The sealed, compressible container includes first and second magnets disposed within the container such that the first and second magnets are separated by a first distance when a fluid within the sealed, compressible container is at a first pressure. The method for determining whether the chamber is sealed includes determining a measured distance between the magnets prior to delivering the downhole apparatus into a wellbore and then comparing the measured distance to the first distance.

Other objects, features, and advantages of the invention will become apparent with reference to the drawings, detailed description, and claims that follow.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The apparatuses and methods described herein provide monitoring of seals enclosed in downhole tools using non-electronic pressure sensors. The non-electronic pressure sensor provides for a non-electric system that monitors the seals enclosed in the downhole tools without disassembling the downhole tools and without introducing additional leak paths into sealed areas of the downhole tool. Electronic devices are expensive and can be dangerous and unreliable when used in downhole tools because of the harsh environments in which the downhole tools operate. The temperatures downhole often exceed the operational capabilities of electronic sensors, circuits, batteries, and other electronic devices. Downhole tools may be exposed to extreme changes in temperature and pressure that can cause electronic devices to malfunction. Additionally, downhole tools are exposed to fluids that conduct electricity. Should a seal become compromised, thereby exposing an electronic device to fluids that conducts electric, the electronic device may malfunction or even create a safety hazard during tool maintenance. For example, lithium battery-powered gauges have been known to explode during tool maintenance if the lithium battery-powered gauges have been exposed to conducting fluids. By using a non-electronic pressure sensor, determining whether a seal has failed may be assessed safely and without unnecessary disassembly of the tool.

Some of the illustrative embodiments described in the following disclosure, such as a tester valve in which a non-electronic pressure sensor resides, may be used to evaluate a formation through which a well passes. Tester valves, or other downhole devices that incorporate the non-electronic pressure sensors described herein may be used with any of the various techniques employed for evaluating formations including, without limitation, wireline formation testing (WFT), measurement while drilling (MWD), and logging while drilling (LWD). The various valves and tools described herein may be delivered downhole as part of a wireline-delivered downhole assembly or as a part of a drill string.

As used herein, the phrases "fluidly coupled," "fluidly connected," and "in fluid communication" refer to a form of coupling, connection, or communication related to fluids, and the corresponding flows or pressures associated with these fluids. Reference to a fluid coupling, connection, or communication between two components describes components that are associated in such a way that a fluid can flow between or among the components.

Figure 1:
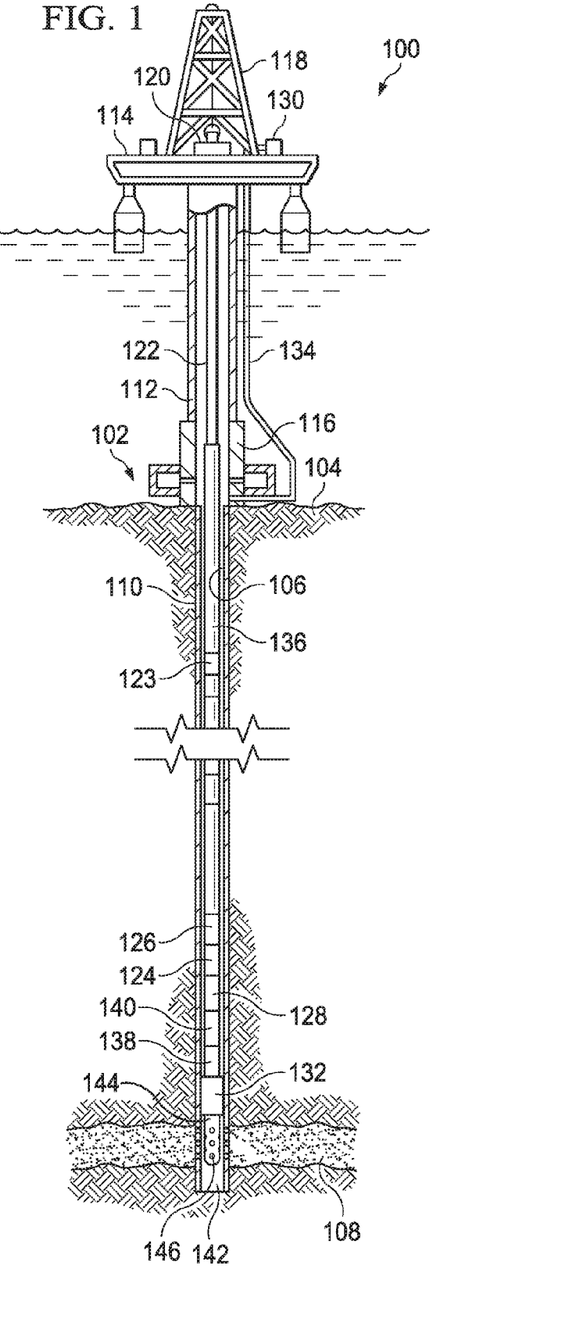
FIG. 1 illustrates a schematic depiction of a well test string, including a tester valve, in place on an offshore well.

Referring to FIG. 1, a floating platform 100 is positioned over a submerged oil or gas well 102 located in the sea floor 104 having a bore hole 106 that extends from the sea floor 104 to a submerged formation 108 to be tested. The bore hole 106 (also referred to as a wellbore) may be lined by a casing 110 that may be cemented into place. A subsea conduit 112 extends from a deck 114 of the floating platform 100 into a wellhead installation 116. The floating platform 100 further includes a derrick 118 and a hoisting apparatus 120 for raising and lowering tools to drill, test, and complete the oil or gas well 102.

A testing string 122 is lowered into the bore hole 106 of the oil or gas well 102. The testing string 122 includes such tools as a slip joint 123 to compensate for the wave action of the floating platform 100 as the testing string 122 is lowered into place. The testing string 122 may include a tester valve 124, a circulation valve 126, and a check valve assembly 128.

The slip joint 123 may be similar to that described in U.S. Pat. No. 3,354,950 to Hyde. The circulation valve 126 may be an annulus pressure responsive type and may be similar to that described in U.S. Pat. No. 3,850,250 to Holden et al, or may be a combination circulation valve and sample entrapment mechanism similar to those disclosed in U.S. Pat. No. 4,063,593 to Jessup or U.S. Pat. No. 4,064,937 to Barrington. The circulation valve 126 may also be the re-closable type as described in U.S. Pat. No. 4,113,012 to Evans et al.

The check valve assembly 128 as described in U.S. Pat. No. 4,328,866 filed Mar. 7, 1980, which is annulus pressure responsive, may be located in the testing string 122 below the tester valve 124 of the present invention.

The tester valve 124, the circulation valve 126 and the check valve assembly 128 may be operated by fluid annulus pressure exerted by a pump 130 on the deck 114 of the floating platform 100. Pressure changes are transmitted by a pipe 134 to a well annulus 136 between the casing 110 and the testing string 122. Well annulus pressure is isolated from the formation 108 by a packer 138 having an expandable sealing element 132 thereabout set in the casing 110 adjacent to the formation 108. The packer 138 may be any suitable packer, such as for example a Baker Oil Tool™ Model D packer, an Otis™ type W packer or the Halliburton Services EZ Drill® SV packer.

The testing string 122 includes a tubing seal assembly 140 at the lower end of the testing string 122. The tubing seal assembly 140 stabs through a passageway within the packer 138 to form a seal isolating the well annulus 136 above the packer 138 from an interior bore portion 142 of the well immediately adjacent the formation 108 and below the packer 138.

A perforated tail piece 144, or other production tube, is located at the bottom end of the tubing seal assembly 140 to allow formation fluids to flow from the formation 108 into the flow passage of the testing string 122. Formation fluid is admitted into the interior bore portion 142 through perforations 146 provided in the casing 110 adjacent the formation 108.

A formation test controls the flow of fluid from the formation 108 through the flow channel in the testing string 122 by applying and releasing fluid annulus pressure to the well annulus 136 by the pump 130 to operate the tester valve 124, the circulation valve 126 and the check valve assembly 128. The formation test measures the pressure build-up curves and fluid temperature curves with appropriate pressure and temperature sensors in the testing string 122 as described in more detail in the aforementioned patents, all of which are incorporated herein by reference.

While the well 102 is illustrated as being an offshore well in FIG. 1, the systems, apparatuses, and methods described herein will function equally well in an on-shore well.

Referring now to FIGS. 2A-2D, a tester valve 200 according to an illustrative embodiment will be described in more detail. The tester valve 200 is similar to the tester valve 124 shown in FIG. 1 and is also similar in function to the tester valve described in U.S. Pat. No. 5,341,883, which is hereby incorporated by reference. The tester valve 200 is depicted schematically in FIGS. 2A-2D and includes a valve housing 202 that is substantially cylindrical in shape and includes a central passage 204 extending the length of the valve housing 202. The valve housing 202 includes threaded connection components 206a (shown in FIG. 2A) and 206b (shown in FIG. 2D) to allow connection of the tester valve 200 within a test string, such as the testing string 122 shown in FIG. 1, or to other downhole devices. The valve housing 202 may be comprised of a number of sub-housing units that when connected form the valve housing 202. In one illustrative embodiment, the valve housing 202 may be comprised of sub-housing units such as an upper adapter unit 238, a first valve housing unit 240, a rupture disc housing unit 242, and a bypass housing unit 244.

A first valve member 208 is rotatably positioned within the valve housing 202 and is axially anchored within the valve housing 202 by upper and lower ring-shaped valve seats 210, 212 positioned above and below the first valve member 208. The upper valve seat 210 is disposed adjacent an upper seat carrier 214, the upper seat carrier 214 being connected to the valve housing 202 at a threaded connection 218. The lower valve seat 212 is supported by a lower seat carrier 216. The lower seat carrier 216 is connected to the upper seat carrier 214 above the first valve member 208 at threaded connection 220 (shown in FIG. 2A). In one embodiment, the first valve member 208 may be a ball valve member.

Figure 2A:
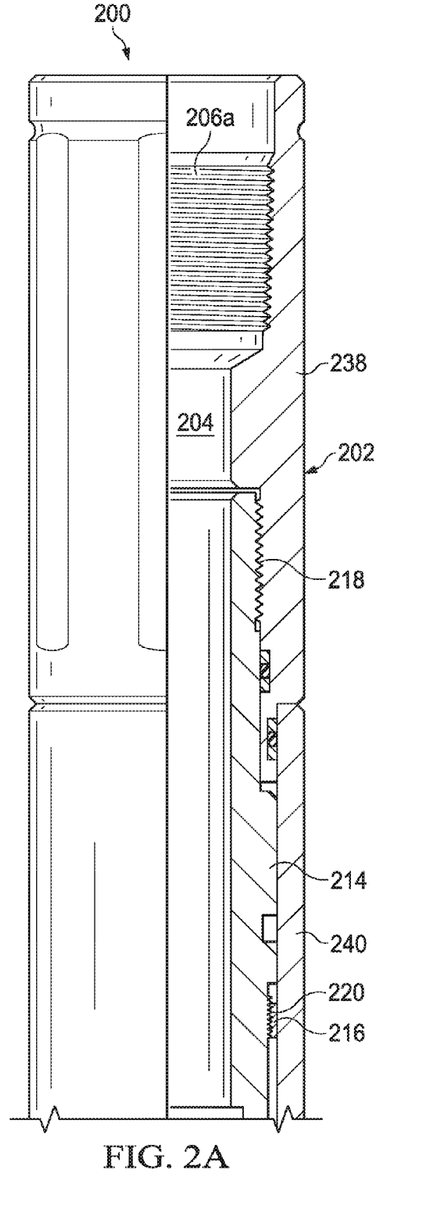
FIGS. 2A-2D illustrate partial, cross-sectional views of a testing valve according to an illustrative embodiment for use in the well test string shown in FIG. 1.
Figure 2B:
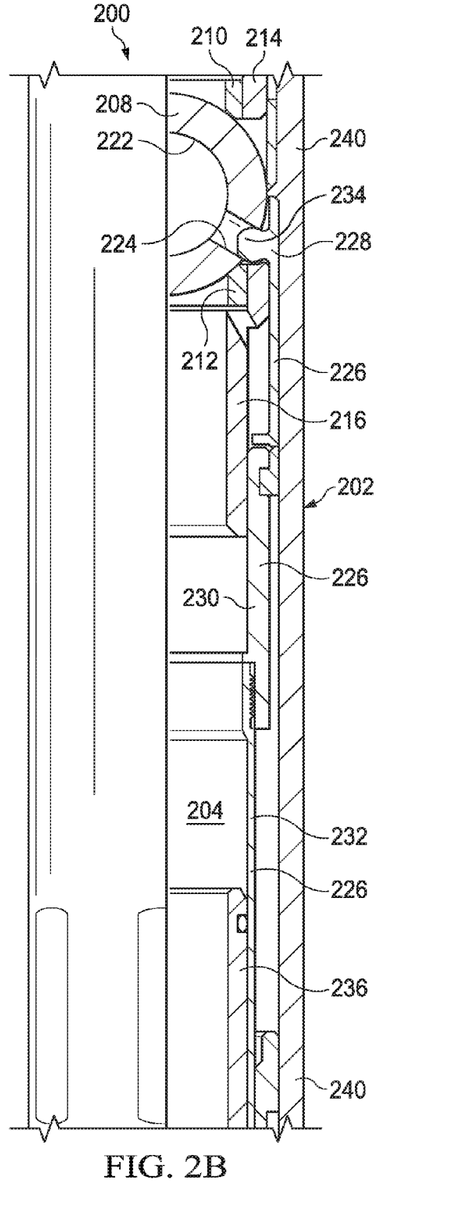

The first valve member 208 defines a valve bore 222 therethrough and has a recess 224. An actuation assembly 226 is configured to slide along the longitudinal axis of the valve housing 202 to move the first valve member 208 between an open and closed position. The actuation assembly 226 includes an actuation arm 228, a mandrel 230, and a spring ring 232 that are connected so the actuation arm 228, the mandrel 230, and the spring ring 232 slides in tandem along the longitudinal axis of the valve housing 202. A lug 234 extends from the actuation arm 228 to engage the recess 224 on the first valve member 208. In FIG. 2B, the actuation assembly 226 is in a first position and the first valve member 208 is in a closed position. Should the actuation assembly 226 be pushed upward—sliding along the longitudinal axis of the valve housing 202—into a second position, the lug 234 will engage the recess 224 exerting a force on the recess 224. The force exerted on the recess 224 will cause the first valve member 208 to be pushed or rotated into an open position. When the first valve member 208 is in the open position, the valve bore 222 is substantially aligned with the central passage 204, allowing fluids in the central passage 204 to pass through the valve bore 222. Conversely, when the first valve member 208 is in the closed position, the valve bore 222 is misaligned with the central passage 204, blocking fluids in the central passage 204 from moving past the first valve member 208. In another embodiment (not shown), the actuation assembly may be in a second position while the first valve member is in a closed position. In this embodiment, the actuation assembly would correspondingly be in a first position when the first valve member is in the open position.

Figure 2C:
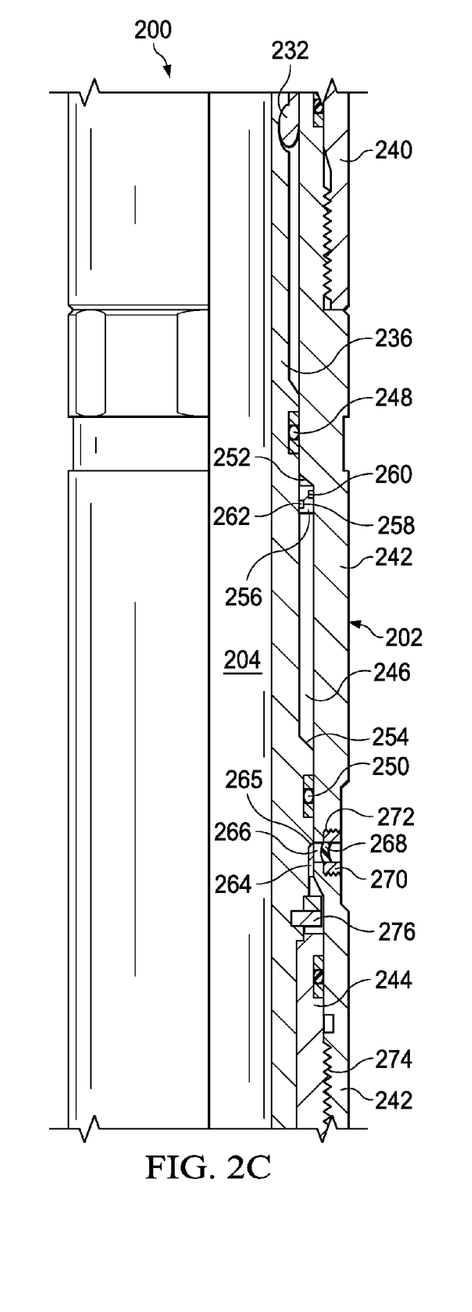
Figure 2D:
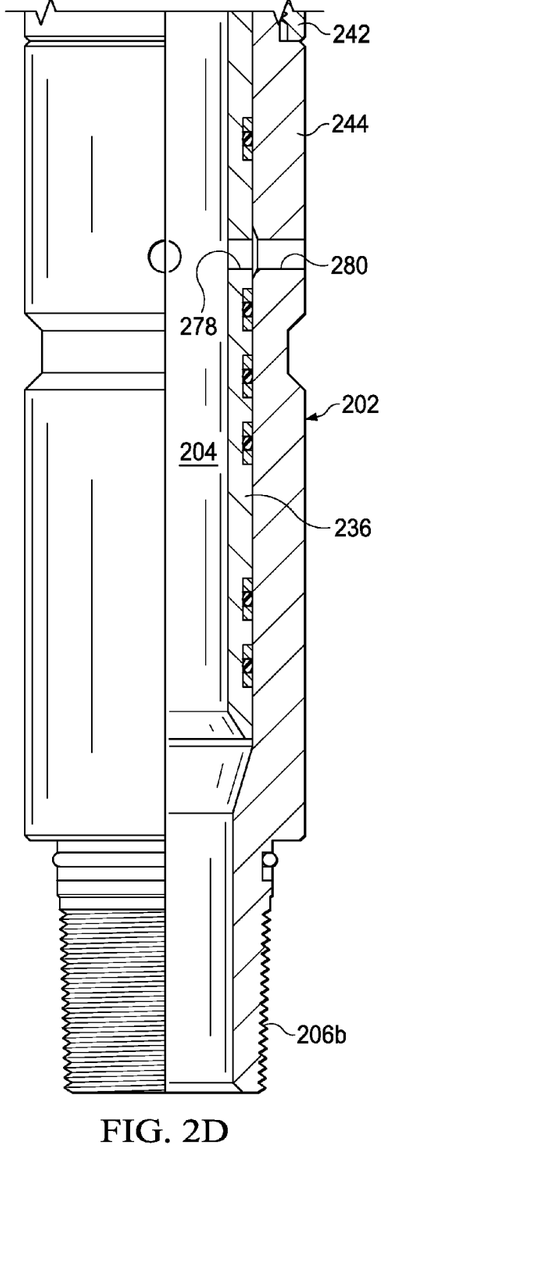

Referring now, specifically, to FIGS. 2B-2D, a second, lower valve member 236 is connected to the actuation assembly 226, and, specifically, the second valve member 236 is connected to the spring ring 232 portion of the actuation assembly 226. The second valve member 236 is slideably disposed in the valve housing 202 and is configured to slide along the longitudinal axis of the valve housing 202. The second valve member 236 may be characterized as a valve sleeve. The second valve member 236 may be positioned in an open or closed position to allow or prevent fluid communication between the central passage 204 and an annulus such as the well annulus 136 shown in FIG. 1.

A first sealed annular volume 246 is formed between the second valve member 236 and the valve housing 202. In one embodiment, the first sealed annular volume 246 is formed between the second valve member 236 and the portion of the valve housing 202 referred to as the rupture disc housing unit 242. In some embodiments, a housing shoulder 252 may be formed in the rupture disc housing unit 242 and a corresponding sleeve shoulder 254 may be formed in the second valve member 236. In this embodiment, the housing shoulder 252 and the sleeve shoulder 254 help form the first sealed annular volume 246.

The first sealed annular volume 246 may be filled with low pressure air and, thus, may be characterized as an air chamber. Alternatively, the first sealed annular volume 246 may be filled with an inert gas or another gas such as nitrogen A first annular seal 248 may be positioned above the first sealed annular volume 246 to provide sealing engagement between the second valve member 236 and the valve housing 202. A second annular seal 250 may be positioned below the first sealed annular volume 246 to provide sealing engagement between the second valve member 236 and the valve housing 202. In one embodiment, only the second annular seal 250 may be used. In another embodiment, the second annular seal 250 may be the primary seal and the first annular seal 248 may be a redundant seal that is in place in the event the primary seal fails.

A damper, such as a bumper 256 may be positioned in the first sealed annular volume 246 between the housing shoulder 252 and the sleeve shoulder 254. The bumper 256 may be formed with staggered, inner and outer grooves 258, 260. The inner and outer grooves 258, 260 allow the bumper 256 to partially collapse in the presence of a longitudinal force. In one embodiment, the inner and outer grooves 258, 260 allow the bumper 256 to partially collapse or compress if the second valve member 236 slides upward relative to the valve housing 202 such that the sleeve shoulder 254 engages the housing shoulder 252 causing a compressive force to be applied to the bumper 256. As shown in FIG. 2C, the bumper 256 is positioned between the sleeve shoulder 254 and the housing shoulder 252.

A non-electronic pressure sensor 262, according to an illustrative embodiment, may be positioned in the first sealed annular volume 246. In one embodiment, the non-electronic pressure sensor 262 is disposed within the inner groove 258 of the bumper 256. In another embodiment, the non-electronic pressure sensor 262 is disposed in the outer groove 260 of the bumper 256. The non-electronic pressure sensor 262 may be used to determine whether the first annular seal 248, the second annular seal 250, the first sealed annular volume 246, or any combination of these components has failed or been compromised. One embodiment of a non-electronic pressure sensor that may be used as the non-electronic pressure sensor 262 shown in FIG. 2C will be described in more detail below with reference to FIGS. 3 and 4A-4B.

Referring still to FIGS. 2C-2D, a second sealed annular volume 264 is formed between the second valve member 236 and the valve housing 202, below the first sealed annular volume 246. Specifically, the second sealed annular volume 264 may be formed between the second valve member 236 and the portion of the valve housing 202 referred to as the rupture disc housing unit 242. The second valve member 236 may include an actuation shoulder 265 that defines a top portion of the second sealed annular volume 264. The second annular seal 250 fluidly isolates the first sealed annular volume 246 and the second sealed annular volume 264.

The portion of the valve housing 202 referred to as the rupture disc housing unit 242 includes a rupture port 266 disposed transversely through the rupture disc housing unit 242. The rupture port 266 is aligned with and fluidly communicates with the second sealed annular volume 264. Thus, the rupture port 266 is positioned below the second annular seal 250 and the first sealed annular volume 246. A rupture disc 268 is disposed across rupture port 266 and held in place by a rupture disc retainer 270 that is attached to the rupture disc housing unit 242 at threaded connection 272. The rupture disc 268 prevents fluid communication through the rupture port 266 until the rupture disc 268 is ruptured. The rupture port 266 is in fluid communication with an annulus, such as the well annulus 136 shown in FIG. 1, and is configured to facilitate fluid communication between an annulus and the second sealed annular volume 264 in the event the rupture disc 268 is ruptured.

A lower portion of the rupture disc housing unit 242 is attached to a top portion of the bypass housing unit 244 at threaded connection 274. A shear pin 276 is positioned below the rupture port 266 and initially locks the second valve member 236 with respect to the bypass housing unit 244. In the event the shear pin 276 is sheared, the second valve member 236 is configured to slide relative to the valve housing 202, which includes the bypass housing unit 244 portion of the valve housing 202, along the longitudinal axis of the valve housing 202.

Referring now specifically to FIG. 2D, a sleeve port 278 is formed in the second valve member 236 and a housing port 280 is formed in the bypass housing unit 244.

As shown, the sleeve port 278 and the housing port 280 are aligned and, thus, in fluid communication. When the sleeve port 278 and the housing port 280 are aligned, the second valve member 236 is in the open position. It should be further understood that when the housing port 280 is in fluid communication with the sleeve port 278, the housing port 280 is also in fluid communication with the central passage 204. Although not shown, when the sleeve port 278 and the housing port 280 are misaligned, the second valve member 236 is in the closed position, meaning there is no fluid communication between the housing port 280 and the sleeve port 278.

Referring now to FIGS. 1-2D, an illustrative mode of operation will be described. The testing string 122, including the tester valve 200 shown in detail in FIGS. 2A-2D, is lowered into the bore hole 106 with the first valve member 208 in the closed position and the second valve member 236 in the open position. When the first valve member 208 is closed, the portion of the testing string 122 above the first valve member 208 may be pressure tested to check for leaks in the testing string 122.

Pressure may be applied to well annulus 136. Once the pressure reaches a predetermined level, the rupture disc 268 will rupture, thereby communicating well-annulus fluid pressure into the second sealed annular volume 264. The pressure will act upwardly on the actuation shoulder 265 formed on the second valve member 236, causing sufficient upward force on the second valve member 236 to shear the shear pin 276. The second valve member 236 will then slide or move upwardly causing the sleeve port 278 and the housing port 280 to become misaligned, thereby closing the second valve member 236.

The pressure acting on the second valve member 236 may cause the second valve member 236 to move rapidly. The upward sliding movement of the second valve member 236 is limited when the sleeve shoulder 254 contacts the bumper 256. The bumper 256 is crushed between the sleeve shoulder 254 and the housing shoulder 252. The collapse of the bumper 256 cushions the blow and prevents damage that would be caused by the direct impact of sleeve shoulder 254 with the housing shoulder 252. The tester valve 200 may be later removed from the well bore and disassembled and retrimmed for later use.

The upward sliding movement of the second valve member 236 will move the actuation assembly 226 upward with respect to the valve housing 202. The upward movement of the actuation assembly 226 engages the first valve member 208, rotating the first valve member 208 into its open position.

Now referring to FIGS. 3 and 4A-4B, an illustrative embodiment of a non-electronic pressure sensor 300 will be described. The non-electronic pressure sensor 300 is similar to or may be the same as the non-electronic pressure sensor 262 described above in reference to FIG. 2C. While the non-electronic pressure sensors 300 and 262 are being described for use in the first sealed annular volume 246 referenced in FIG. 2C, it should be appreciated that the non-electronic pressure sensors described herein may be used in any sealed chamber for use in a wellbore to check the sealing integrity of the sealed chamber.

The non-electronic pressure sensor 300 includes a sealed, compressible container 302 having a fluid 314 sealed within the container 302. The sealed, compressible container 302 may be formed from a material such as polytetrafluoroethylene that is both compressible and flexible. The material used to form the sealed, compressible container 302 may be non-permeable to prevent fluid leakage. The container 302 may be clear or opaque, and the container 302 may further be any shape, such as cylindrical or rectangular, as long as the container 302 is capable of freely expanding or contracting relative to a longitudinal center line 312 of the container 302. In one embodiment, the container 302 may also have bending flexibility, allowing the container 302 to expand or contract while the container 302 is bent into a curved or arcing position. For example, FIGS. 4A and 4B illustrate an embodiment where the container 302 is disposed within an inner groove 308 of a bumper 310 (wherein the bumper 310 is similar to the bumper 256 illustrated in FIG. 2C). As illustrated more clearly in FIG. 4A, the container 302 is bent or curved to follow the curve of the bumper 310. While the container 302 is curved, the container 302 is still capable of expanding or contracting along the longitudinal center line 312 of the container 302.

Figure 4A:
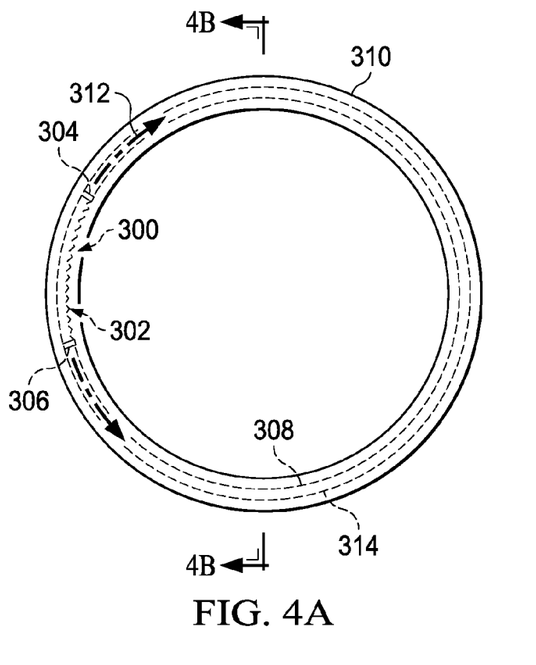
FIG. 4A illustrates a top view of a bumper that may be used in the pressure valve shown in FIGS. 2A-2D with the non-electronic pressure sensor of FIG. 3 shown disposed within the bumper via hidden lines.
Figure 4B:
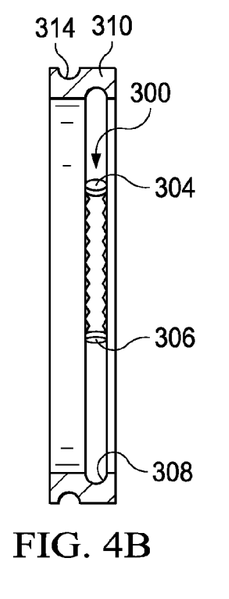
FIG. 4B illustrates a cross-sectional view of the bumper of FIG. 4A taken along 4A-4A showing a side view of the non-electronic pressure sensor of FIG. 3 disposed within an inner groove of the bumper.

Referring to FIGS. 4A-4B, the bumper 310 may be formed with staggered, inner and outer grooves 308, 314. The inner and outer grooves 308, 314 allow the bumper 310 to partially collapse in the presence of a longitudinal force. While the non-electronic pressure sensor 300 is shown in FIGS. 4A-4B as disposed within the inner groove 308 of the bumper 310, the non-electronic sensor 300 may, alternatively, be disposed in the outer groove 314 of the bumper 310.

Referring again to FIGS. 3 and 4A-4B, the sealed, compressible container 302 may be characterized as an aneroid bellows in one illustrative embodiment because the container 302 may be actuated into compressing or expanding without fluids passing through the container 302. Additionally, the compressing and expanding may be facilitated by a wall 316 of the container 302 being pleated or corrugated. The fluid 314 in container 302 may be air or another compressible inert gas such as nitrogen.

The non-electronic pressure sensor 300 further includes a first magnet 304 and a second magnet 306. The first and second magnets 304, 306 may be positioned within the sealed, compressible container 302. Furthermore, the first and second magnets 304, 306 may be attached to opposing ends of the sealed, compressible container 302. In another illustrative embodiment (not shown), the first and second magnets 304, 306 may be attached to an outer surface 318 of the container 302. The first and second magnets 304, 306 may be oriented relative to each other such that a magnetic force represented by arrows 320 push the first and second magnets 304, 306 apart. At atmospheric pressure, the first magnet 304 is a distance, $d_{atm}$, from the second magnet 306 (shown in FIG. 3). For example, in an illustrative embodiment, the first magnet 304 and the second magnet 306 may be a distance apart of 1 inch at atmospheric pressure. In this example, when the testing valve is pressure tested, the first and second magnets 304, 306 should maintain a distance of 1 inch if the sealed chamber, which the non-electronic pressure sensor 300 is disposed, has maintained its seal. If the first and second magnets 304, 306 are a distance less than 1 inch, then the sealed chamber likely has a seal leak. For example, under this scenario, if the first and second magnets 304, 306 are a distance of 0.5 inches apart, then the sealed chamber may have a 15 psi leak. Likewise, with a 30 psi leak, the first and second magnets 304, 306 would be approximately 0.25 inch apart, and with a 60 psi leak the first and second magnets 304, 306 would be approximately 0.125 inch apart. Pressure testing is commonly performed at pressures ranging from 5,000 to 15,000 psi. Using pressures in the 5,000 to 15,000 psi range to pressure test, would cause the first and second magnets 304, 306 to essentially be 0 inches apart if there was a leak in the sealed chamber, making the first and second magnets 304, 306 appear as a single magnet when checked with a sensing unit such as a Gauss meter.

In operation, a sensing unit (not shown) that may include a Gauss meter or a magnetometer may be used to determine the distance between the first and second magnets 304, 306. When the sensor 300 is positioned in a valve such as tester valve 124 of FIGS. 2A-2D, the sensing unit may be moved along the outside of the valve housing 202 in the general vicinity of where the non-electronic pressure sensor 300 is located to determine the distance between the first and second magnets 304, 306.

Figure 3:
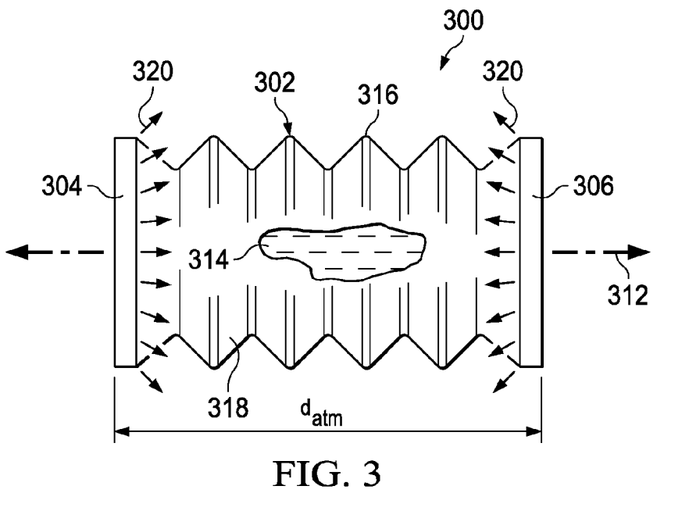
FIG. 3 illustrates a side view of a non-electronic pressure sensor according to an embodiment.

Referring now to FIGS. 1-3, an illustrative embodiment of how a non-electronic pressure sensor may operate in a tester valve will be described. The non-electronic pressure sensor may be positioned in a sealed, annular volume. First and second magnets disposed within the non-electronic pressure sensor will be separated by a first distance when a fluid within the annular volume is at a first pressure. Correspondingly, the first and second magnets will be separated by a second distance when a fluid within the annular volume is at a second pressure different than the first pressure. In a non-limiting illustrative embodiment, the second distance between the magnets may be less than the first distance between the magnets if the second pressure in the annular volume is greater than the first pressure in the annular volume.

In another illustrative embodiment, prior to employing a testing valve in a wellbore, a seal positioned between a first annular volume and a second annular volume may be tested. A user may monitor the distance between first and second magnets disposed within a non-electronic pressure sensor using a sensing unit while fluid pressure is increased in the second annular volume. The distance between the magnets will indicate whether the fluid pressure in the first annular volume increased in response to an increase of fluid pressure in the second annular volume. A change in distance between the magnets after fluid pressure is increased in the second annular volume may indicate a lack of seal integrity.

Figure 5:
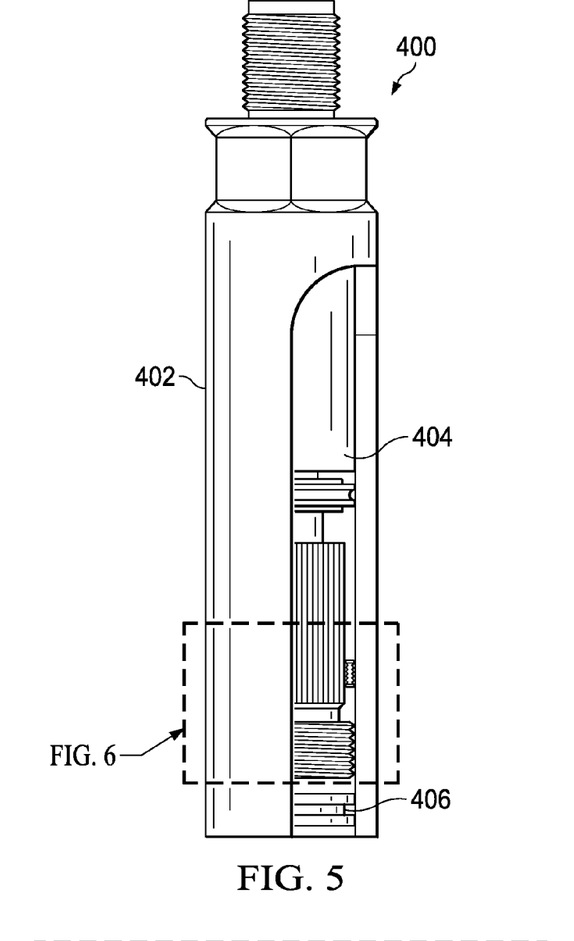
FIG. 5 illustrates a partial cross-sectional view of a battery housing that may be used in a well string according to one illustrative embodiment.
Figure 6:
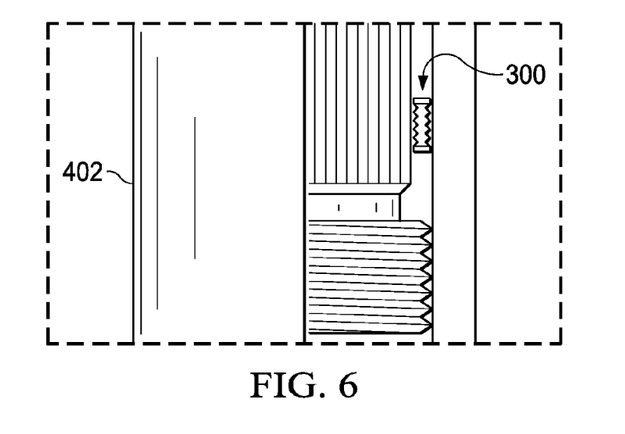
FIG. 6 illustrates a detailed view of the battery housing of FIG. 5, illustrating a non-electronic pressure sensor positioned within the battery housing.

Referring now to FIGS. 5-6, additional, non-limiting embodiments in which the non-electronic pressure sensor 300 may be used are described. Referring specifically to FIGS. 5-6, a battery operated pressure gauge 400 that may be used as part of a wireline tool (not shown) is illustrated. The battery operated pressure gauge 400 may include a battery housing 402 that sealingly encloses a battery pack 404 and a pressure sensor 406. The non-electronic pressure sensor 300 may be sealingly positioned within the battery housing 402. The battery pack 404 may be comprised of lithium batteries, especially if precise pressure data is needed. Lithium batteries have been known to explode during tool maintenance if the lithium batteries have been exposed to conducting fluids. Using the non-electronic pressure sensor 300 to detect whether the pressure within the battery housing 402 has been compromised may act as a warning device to inform users conducting maintenance to proceed with caution when opening the battery housing 402.

Figure 7:
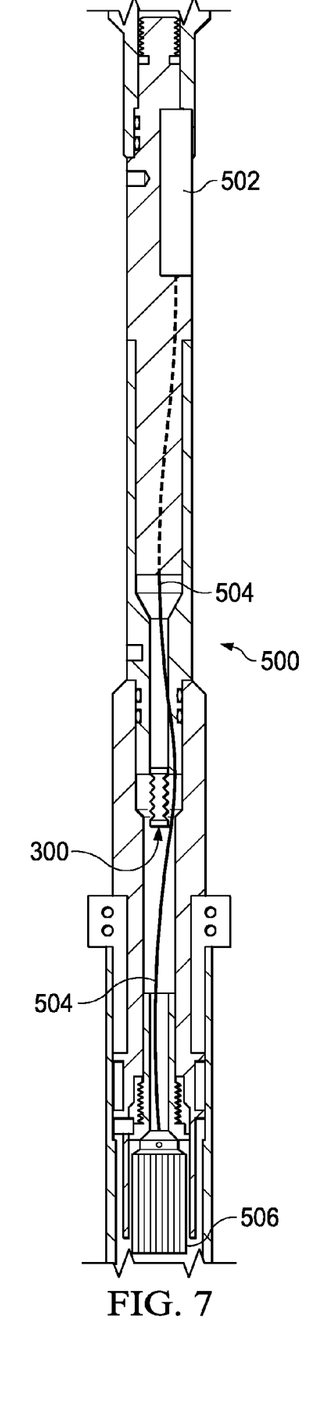
FIG. 7 illustrates a cross-sectional view of an electronic pressure gauge according to an illustrative embodiment for use in a wireline tool with a non-electronic pressure sensor positioned within the electronic pressure gauge.

Referring now to FIG. 7, the non-electronic pressure sensor 300 as described herein may further be used in conjunction with another embodiment of an electronic pressure gauge 500 that may be used, for example, in a wireline tool (not specifically shown). The electronic pressure gauge 500 shown in FIG. 7 is positioned in a sealed air chamber (not shown). As illustrated, a quartz pressure sensor 502 is connected by wires 504 to a connector 506. The non-electronic pressure sensor 300 may be used as described above to determine whether the sealed air chamber surrounding the electronic pressure gauge 500 has been compromised. It is not uncommon for fluids downhole to be comprised of natural gases, including poisonous gases such as hydrogen sulfide. Thus, knowing whether a sealed air chamber has been compromised may become a matter of safety if a user unknowingly opens an electronic housing containing a gas such as hydrogen sulfide.

Figure 8:
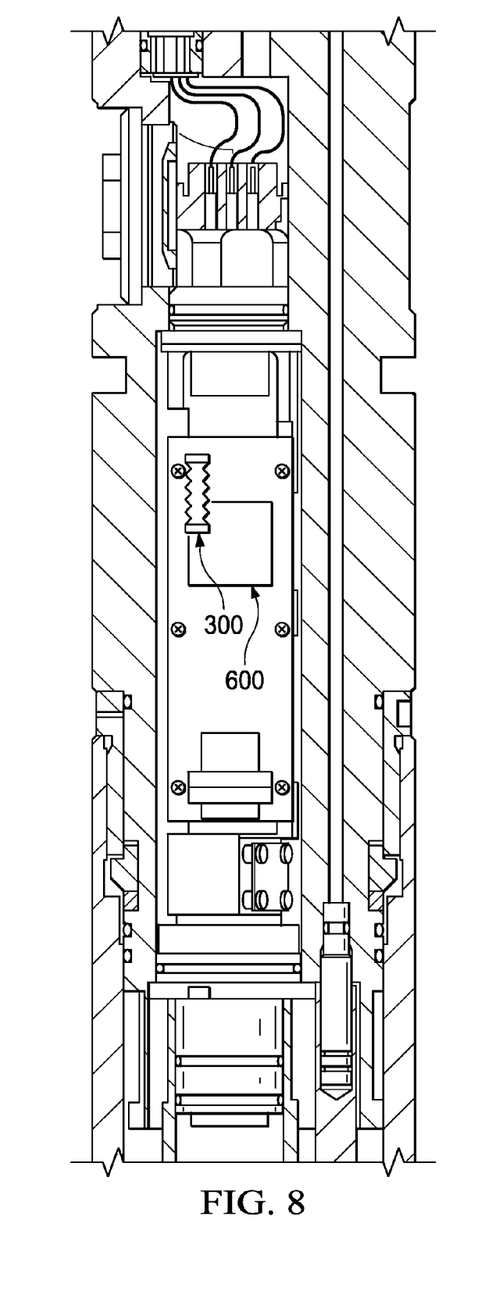
FIG. 8 illustrates a cross-sectional view of an electronic pressure gauge according to an illustrative embodiment for use in a wireline tool with a non-electronic pressure sensor of positioned within the electronic pressure gauge.

Referring now to FIG. 8, the non-electronic pressure sensor 300 as described herein may further be used in conjunction with an electronic circuit board 600. The electronic circuit board 600 may be used, for example, in a wireline tool (not specifically shown). The electronic circuit board 600 illustrated in FIG. 8 is positioned in a sealed air chamber (not shown). The non-electronic pressure sensor 300 may be used as described above to determine whether the sealed air chamber surrounding the electronic circuit board 600 has been compromised.

The orientation, and specific mechanisms of the testing valve described above are for illustrative purposes only. It should be understood that other configurations of testing valves may be used. For example, in another illustrative embodiment, the testing valve used could have a mirroredorientation to the testing valve described above. E.g., the second valve member 236 may be positioned above the first valve member 208 and when the second valve member 236 is in the closed position a downward force acts upon the first valve member 208 to push the first valve member 208 into the open position.

It should be apparent from the foregoing that an invention having significant advantages has been provided. While the invention is shown in only a few of its forms, it is not limited to only these embodiments but is susceptible to various changes and modifications without departing from the spirit thereof.

I claim:

1. A valve for use in a wellbore, the valve comprising:
a housing configured to form a central passage;
a first valve member positionable in an open or closed position to allow or prevent flow through the central passage;
a second valve member positionable in an open or closed position to allow or prevent fluid communication between the central passage and an annulus positioned between the valve and the wellbore;
an actuation assembly connected to the first valve member and the second valve member, the actuation assembly movable between a first position and a second position to selectively position each of the first valve member and the second valve member;
a sealed annular volume formed between the second valve member and the housing; and
a pressure sensor disposed in the sealed annular volume, the pressure sensor comprising:
a sealed, compressible container, and
a first magnet and a second magnet positioned within the sealed, compressible container, the first and second magnets separated by a first distance when a fluid within the sealed annular volume is at a first pressure,
wherein the first and second magnets are separated by a second distance when the fluid in the sealed annular volume is at a second pressure; and
a sensing unit positioned on the exterior of the valve housing adjacent to the pressure sensor to determine whether the second distance between the first and second magnets at the second pressure is different from the first distance at the first pressure.

2. The valve of claim 1, wherein the second pressure is greater than the first pressure and the second distance is less than the first distance.

3. The valve of claim 1, wherein:
responsive to the actuation assembly being in the first position, the first valve member is in the closed position and the second valve member is in the open position; and
responsive to the actuation assembly being in the second position, the first valve member is in the open position and the second valve member is in the closed position.

4. The valve of claim 1, wherein:
responsive to the actuation assembly being in the first position, the first valve member is in the open position, and the second valve member is in the closed position; and
responsive to the actuation assembly being in the second position, the first valve member is in the closed position and the second valve member is in the open position.

5. The valve of claim 1, wherein the actuation assembly is in the first position when the valve is initially deployed in the wellbore.

6. The valve of claim 1, wherein the first valve member is a ball valve member positioned within the housing and rotatable between the open and closed positions.

7. The valve of claim 1, wherein the second valve member is a valve sleeve slidably positioned within the housing, the valve sleeve having a sleeve port that aligns with a housing port in the housing when the valve sleeve is in the open position, the sleeve port and the housing port being misaligned when the valve sleeve is in the closed position.

8. The valve of claim 1, wherein the first and second magnets are orientated such that a magnetic force between the first and second magnets pushes the first and second magnets apart.

9. The valve of claim 1, wherein the actuation assembly further comprises:
an actuation arm operably associated with the first valve member to position the first valve member in the open position or the closed position;
a spring ring operably associated with the second valve member; and
a mandrel disposed between the actuation arm and the spring ring, an upper portion of the mandrel attached to the actuation arm and a lower portion of the mandrel attached to the spring ring;
wherein the second valve member is slidably disposed within the housing and connected to the actuation assembly for mutual, axial sliding movement within the housing, the second valve member having a valve member port there through configured to be aligned with a housing port disposed through the housing when the second valve member is in the open position, the second valve member port and the housing port being misaligned when the second valve member is in the closed position.

10. The valve of claim 1, further comprising:
an rupture port disposed in the housing and capable of providing fluid communication between the annulus and a second annular volume between the housing and the actuation assembly;
a rupture disk disposed in the rupture port to prevent fluid communication through the rupture port until the rupture disk is ruptured; and
a seal positioned between the first annular volume and the second annular volume to prevent fluid communication between the first annular volume and the second annular volume.

11. The valve of claim 10, wherein prior to deployment of the valve in the wellbore, the seal may be tested by increasing a pressure of fluid in the second annular volume, and determining by monitoring of a distance between the first and second magnets whether the pressure of the fluid in the first annular volume increases.

12. The valve of claim 1, further comprising a bumper disposed in the sealed annular volume, wherein the pressure sensor is disposed within a groove of the bumper.

13. An apparatus for use in a wellbore, the apparatus comprising:
a housing having at least one chamber capable of receiving a fluid;
a sealed annular volume; and
a pressure sensor disposed in the sealed annular volume, the sensor comprising:
a sealed, compressible container, and
a first magnet and a second magnet positioned within the sealed, compressible container, the first and second magnets separated by a first distance when a fluid within the sealed annular volume is at a first pressure,
wherein the first and second magnets are separated by a second distance when the fluid in the sealed annular volume is at a second pressure; and a sensing unit positioned on the exterior of the valve housing adjacent to the pressure sensor to determine whether the second distance between the first and second magnets at the second pressure is different from the first distance at the first pressure.

14. The apparatus of claim 13, wherein the sensing unit is positionable by a user outside of the housing to determine a distance between the first and second magnets.

15. The apparatus of claim 14, wherein the sensing unit is a Gauss meter.

16. The apparatus of claim 14, wherein the sensing unit and the pressure sensor are used to determine whether the chamber is fluidly sealed.

17. The apparatus of claim 13 further comprising:
a second chamber positioned within the housing; and
a seal positioned between the first chamber and the second chamber to fluidly isolate the first chamber from the second chamber.

18. The apparatus of claim 17, wherein the sensing unit is positionable outside of the first chamber as a pressure of a fluid within the second chamber is changed to determine if a distance between the magnets changes, thereby indicating a lack of integrity of the seal.

19. The apparatus of claim 13, wherein the first and second magnets are orientated such that a magnetic force between the first and second magnets pushes the first and second magnets apart.

20. A method of determining whether a seal has failed between a first chamber and a second chamber in a downhole apparatus, the first chamber having disposed therein a sealed, compressible container, the container having first and second magnets disposed therein, the first and second magnets being separated by a first distance when a fluid within the sealed, compressible container is at a first pressure, the method comprising:
changing a pressure of fluid within the second chamber;
determining a measured distance between the magnets; and
comparing the measured distance to the first distance.

21. The method of claim 20 further comprising:
determining that the seal has failed if the measured distance is different than the first distance.

22. The method of claim 20, wherein changing the pressure further comprises increasing the pressure.

23. The method of claim 20, wherein determining the measured distance is performed prior to delivering the downhole apparatus into a wellbore.

24. A method for determining whether a chamber in a downhole apparatus is sealed, the chamber having disposed therein a sealed, compressible container, the container having first and second magnets disposed therein, the first and second magnets being separated by a first distance when a fluid within the sealed, compressible container is at a first pressure, the method comprising:
prior to delivering the downhole apparatus into a wellbore, determining a measured distance between the magnets; and
comparing the measured distance to the first distance.

25. The method of claim 24 further comprising:
determining that the chamber is no longer sealed if the measured distance is different than the first distance.

* * * * *